(12) United States Patent
Cocosel

(10) Patent No.: US 7,475,267 B1
(45) Date of Patent: Jan. 6, 2009

(54) SYSTEMS AND METHODS FOR DELAY IN STARTUP OF MULTIPLE COMPONENTS

(75) Inventor: Bogdan Cocosel, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 436 days.

(21) Appl. No.: 10/816,155

(22) Filed: Mar. 31, 2004

(51) Int. Cl.
*G06F 1/00* (2006.01)
(52) U.S. Cl. ............................ 713/330; 713/340
(58) Field of Classification Search ............. 713/300, 713/320, 330, 340
See application file for complete search history.

(56) References Cited

U.S. PATENT DOCUMENTS

| | | | | |
|---|---|---|---|---|
| 5,241,685 A * | 8/1993 | Bodin et al. | ............... | 455/453 |
| 5,583,419 A * | 12/1996 | Haller | ............... | 322/8 |
| 5,633,573 A * | 5/1997 | van Phuoc et al. | ............... | 320/128 |
| 5,983,298 A * | 11/1999 | Schultz et al. | ............... | 710/302 |
| 6,069,832 A * | 5/2000 | Ma et al. | ............... | 365/226 |
| 6,081,074 A * | 6/2000 | Frus et al. | ............... | 315/209 CD |
| 6,175,207 B1 * | 1/2001 | Melcher et al. | ............... | 318/661 |
| 6,216,479 B1 * | 4/2001 | Elwood | ............... | 62/230 |
| 6,504,266 B1 * | 1/2003 | Ervin | ............... | 307/29 |
| 6,606,233 B1 * | 8/2003 | Rice et al. | ............... | 361/187 |
| 2003/0186706 A1 * | 10/2003 | Bergins et al. | ............... | 455/452.2 |
| 2005/0215272 A1 * | 9/2005 | Helferich | ............... | 455/512 |
| 2006/0123258 A1 * | 6/2006 | Westerinen et al. | ............... | 713/300 |

* cited by examiner

*Primary Examiner*—Suresh K Suryawanshi
(74) *Attorney, Agent, or Firm*—Fish & Richardson P.C.

(57) ABSTRACT

Systems and methods for delay in startup of multiple components such multiple disk drives in computer systems to stagger associated spikes in resource usage during the initial startup of each component are disclosed. A delay module generally includes a detector to detect signal quality between a power supply line and a system component, a delay generator, and a switch that opens upon detecting insufficient signal quality. The switch may open to disconnect the component from the power supply line upon detection of insufficient signal quality by, e.g., comparing the signal quality to a threshold or detecting signal stability during a predetermined time period. An iteration is performed for each successive detection of insufficient signal quality in which a back off or delay selected from a period that increases for each iteration may be applied.

34 Claims, 3 Drawing Sheets

SYSTEMS AND METHODS FOR DELAY IN STARTUP OF MULTIPLE COMPONENTS

BACKGROUND OF THE INVENTION

1. Field of the Invention

The present invention relates generally to resource management such as power management for computer systems. More specifically, systems and methods for delay in startup of multiple components such multiple disk drives in computer systems to stagger associated spikes in resource usage during the initial startup of each component are disclosed.

2. Description of Related Art

At startup of electronic devices, i.e., any apparatus that draws electrical power, there is typically a spike in the amount of power drawn by the electronic device. Multiple electronic devices often share a power source that has sufficient resources to support the multiple electronic devices during normal operation. However, when many or all of the multiple electronic devices sharing the single power source all start up at the same time, the power source may not be sufficient to support the cumulative spike in the amount of power drawn by the electronic devices during startup, which may lead to failure of the electronic device to startup or even damage to the electronic device.

As an example, when a hard disk drive is first powered up, the hard disk drive begins spinning its spindle assembly. The spike in the power drain at startup is generally much higher than at steady state during normal operation and the amount of power drain at startup typically tapers off quickly after the initial startup as the spindle assembly reaches its operational spin speed. For example, a disk drive may take 5 to 10 seconds during startup to achieve its operational spin speed. In large computer systems employing multiple disk drives, all the disk drives simultaneously attempt to startup at the same time and thus all begin to consume power when the computer system is first powered up. Such simultaneous startup of the disk drives causes a cumulatively large spike in the power demand of the computer system that corresponds to the number of disk drives. As the power supply is typically not designed to support the large initial spike in the power demand by every component of the system, including the multiple disk drives, many of the disk drives may fail to startup in the initial power up. The disk drive is typically hard coded to attempt to startup again several times, e.g., 3 times as may be predetermined and hard coded by the disk drive manufacturer, before the disk drive stops attempting to startup.

Thus, it would be desirable to provide systems and methods for improved resource distribution and management during an initial startup of multiple components such as power distribution and management of a computer system with multiple disk drives. Ideally, the initial spike in the power demand of the multiple electronic devices is managed so as to minimize startup failures in the electronic devices.

SUMMARY OF THE INVENTION

Systems and methods for delay in startup of multiple components such multiple disk drives in computer systems to stagger associated spikes in resource usage during the initial startup of each component are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The systems and methods for delay in component startup may be applied to computer systems with multiple disk drives as well as in various other applications. For example, in a residential application, various electronic devices such as televisions, lights, refrigerators, washers, dryers, etc. typically share a single power source, e.g., a power generator. While the power generator may provide sufficient power to operate all the electronic device during normal operation, if the electronic devices are all started or turned on simultaneously, the cumulative power spike will generally cause the power generator to fail and turn itself off for protection. Thus, the systems and methods for delay in electronic component startup would facilitate in at least somewhat staggering the startup of the various electronic devices so that the power generator would not shut down due to excess power spike.

A delay module generally includes a signal quality detector to detect a power signal quality between a power supply line and a system component, a delay generator to generate a delay in response to detecting an insufficient signal quality and to cause the signal quality detector to again detect the signal quality upon expiration of the random delay, and a switch that opens upon detecting insufficient signal quality and/or closes upon detecting sufficient signal quality. The delay generator may perform an iteration of the delay generation each successive time the signal quality detector detects insufficient signal quality, the delay may be randomly generated, for example, between 0 and $2^{n-1}T$ where n is an iteration number and T is a period from which a delay is selected on a first iteration of generating the delay. The signal quality detector may detect the insufficient or out of bounds signal quality by comparing the signal quality on the power supply line to a threshold signal quality and/or by detecting stability of the signal quality over a predetermined period of time such as by comparing a current signal quality with a delayed signal quality. A timer may be provided to await the delay and to cause the signal quality detector to again detect the signal quality upon expiration of the delay.

One or more delay modules may be incorporated into a system. In particular, the system may generally include a power supply line, a plurality of the delay modules, and a plurality of the system components such as disk drives, each coupled to the power supply line via a corresponding random delay module.

A power management apparatus may generally include a signal quality detecting means for detecting signal quality on a power supply line, a delay generating means for generating a delay in response to the signal quality detecting means detecting insufficient signal quality, the signal quality detecting means again detecting the signal quality on the power supply line upon expiration of the delay generated by the delay generating means, and a switching means for selectively disconnecting from the power supply line upon the detecting of insufficient signal quality and/or connecting to the power supply line upon the detecting of sufficient signal quality.

A method for power management may generally include detecting a signal quality between a power supply line and a power-utilizing component, generating a delay in response to detecting an insufficient signal quality, the detecting being repeated upon expiration of the delay, and switching to disconnect the power-utilizing component from the power supply line upon the detecting of insufficient signal quality and/or connect the power supply line to the power-utilizing component upon the detecting of sufficient signal quality.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for delay in startup of multiple components such multiple disk drives in computer systems to stagger associated spikes in resource usage during the initial startup of each component are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
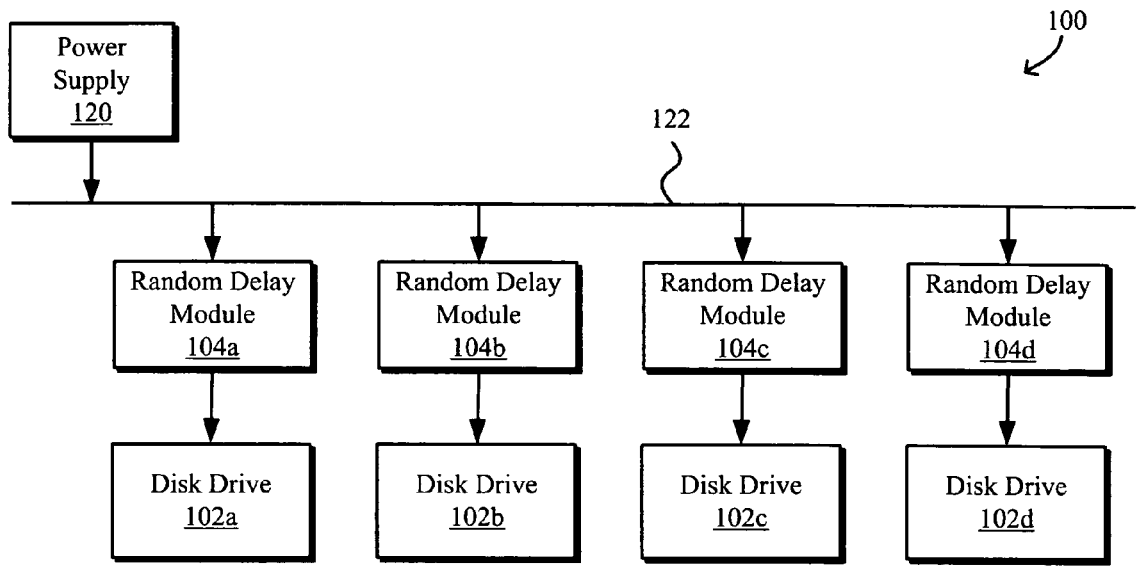
FIG. 1 is a block diagram of multiple disk drives of a computer system with random delay in startup.

FIG. 1 is a block diagram of a computer system 100 with multiple disk drives 102 employing random delay modules 104 to apply random delays in disk drive startup. Various other components of the computer system 100, such as display, motherboard, etc., are not shown for purposes of clarity. Although the random delay modules 104 may be similarly utilized with such other components, hard disk drives are particularly suited for random delays in startup as hard disk drives are generally not startup sensitive in that delaying their startup does not substantially affect the startup of the computer system 100. Furthermore, although the delay module 104 may generate a random delay, a fixed delay may be assigned to each delay module. For example, each delay module may be assigned a different delay so as to facilitate in achieving a staggering of the startup of the multiple components when the power supply may be insufficient to support the simultaneous startup of all the multiple components.

The power source or supply 120 may be, for example, a 220V power source that supplies power to the in-line disk drives 102 via a power supply line 122. The random delay module 104 is coupled between the power supply line 122 and a corresponding disk drive 102, e.g., via a 4-port power connector of the disk drive 102, to apply a random delay in the startup of the corresponding disk drive 102. For example, the random delay module 104 may automatically apply a random delay in the startup of the corresponding disk drive or, alternatively, may test signal quality on the power supply line 122 to determine whether to apply a random delay in startup of the corresponding disk drive.

Figure 2:
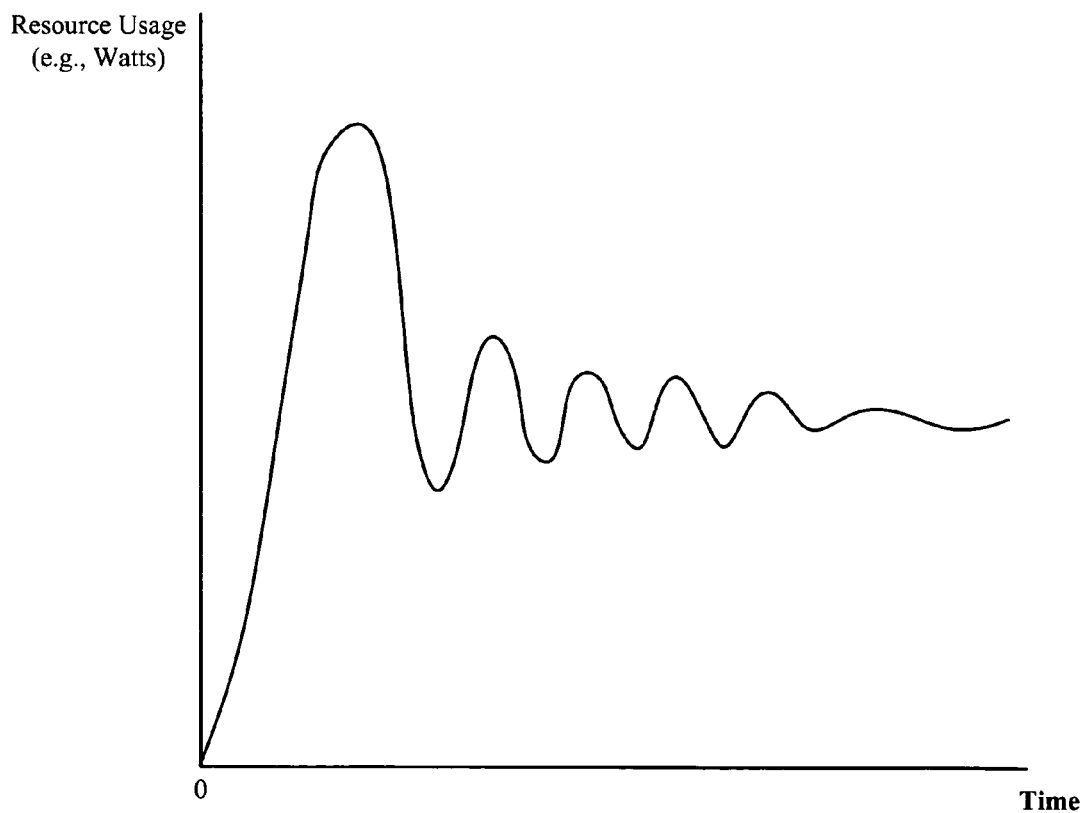
FIG. 2 is an graph of an exemplary resource drain of a component device over time illustrating the spike in the resource during startup.

In particular, as the computer system 100 is first powered up, there is typically a spike in the amount of power drawn or attempted to be drawn from the power supply 120 via the power supply line 122 by the disk drive 102 as its motor begins spinning its spindle assembly. The spike in the power drain is generally much greater than the power drain during steady state operation and the initial spike in the power drain generally tapers off to the steady state level relatively soon after the initial startup as the spindle assembly approaches or reaches its operational spin speed as shown in the resource drain over time plot of FIG. 2. As an example, a Maxtor 540X hard disk drive uses approximately 23.7 W during the initial spin up and approximately 5.2 W during normal operation. Each disk drive may draw a current of approximately 1.5 to 3 amps when the disk drive first performs the spin up operation. The disk drive 102 may take 5 to 10 seconds during startup to achieve its operational spin speed. In a computer system 100 employing multiple disk drives, if all the disk drives simultaneously attempt to startup at the same time when the computer system is first powered up, the simultaneous attempts to start by all the disk drives 102 cause a large cumulative spike in the power demand proportional to the number of disk drives trying to simultaneously start.

The power supplies of conventional computer systems are typically dimensioned to take into account the cumulative spike in the amount of power being simultaneously drawn by all the electronic components, including the multiple hard disk drives, at startup. However, although such large power supplies are needed during the initial startup, only smaller power supplies are needed during normal operation. A larger power supply not only more expensive but is also less efficient than the smaller power supply during normal operation when less power is needed. Thus, the random delay modules 104 are employed to apply a random delay in the startup of the corresponding disk drive 102 in order to stagger the initial power load spike of the multiple disk drives 102 and thus allow the provision of a smaller power supply 120.

In one embodiment, each random delay module 104 determines whether the power signal quality on its line is within or out of bounds, i.e., sufficient or insufficient. For example, if the electronic device expects a correct line voltage of 12V, the random delay module 104 may allow for slight deviation from a predetermined threshold signal quality, i.e., a threshold line voltage value, e.g., 12V±0.2V. If the random delay module 104 determines that the power signal quality is out of bounds, the random delay module 104 applies a random delay in the startup of the corresponding disk drive 102.

It is noted that after the power supply 120 is first powered up, the power signal supplied by the power supply 120 is often noisy for the first few milliseconds and as such, the random delay module 104 may be configured to be less sensitive to the input power signal during the initial noisy time period and/or may delay detecting the input power signal for approximately the initial noisy time period immediately after power up. As an example, the random delay module 104 may check the power signal quality after the power signals are passed through a delay circuit.

Alternatively or additionally to comparing the signal quality to a threshold level, the random delay module 104 may be configured to determine whether the power signal is stable or unstable during a predetermined period of time such as 0.5 sec. To detect for a stable signal over a period of time, a comparison between the current or non-delayed signal with the delayed signal can be made. The delayed signal may be the output from the delay circuit as noted above. Thus the delay circuit facilitates in accounting for the noise associated with the initial powering up of the power supply 120 as well as in determining whether the power signal is stable over a period of time and thus in determining whether to apply a random delay.

Although four disk drives 102a, 102b, 102c, 102d are shown corresponding to four random delay modules 104a, 104b, 104c, 104d, various other configurations of computer systems 100 employing more or fewer disk drives 102 and random delay modules 104 may be implemented.

Figure 3:
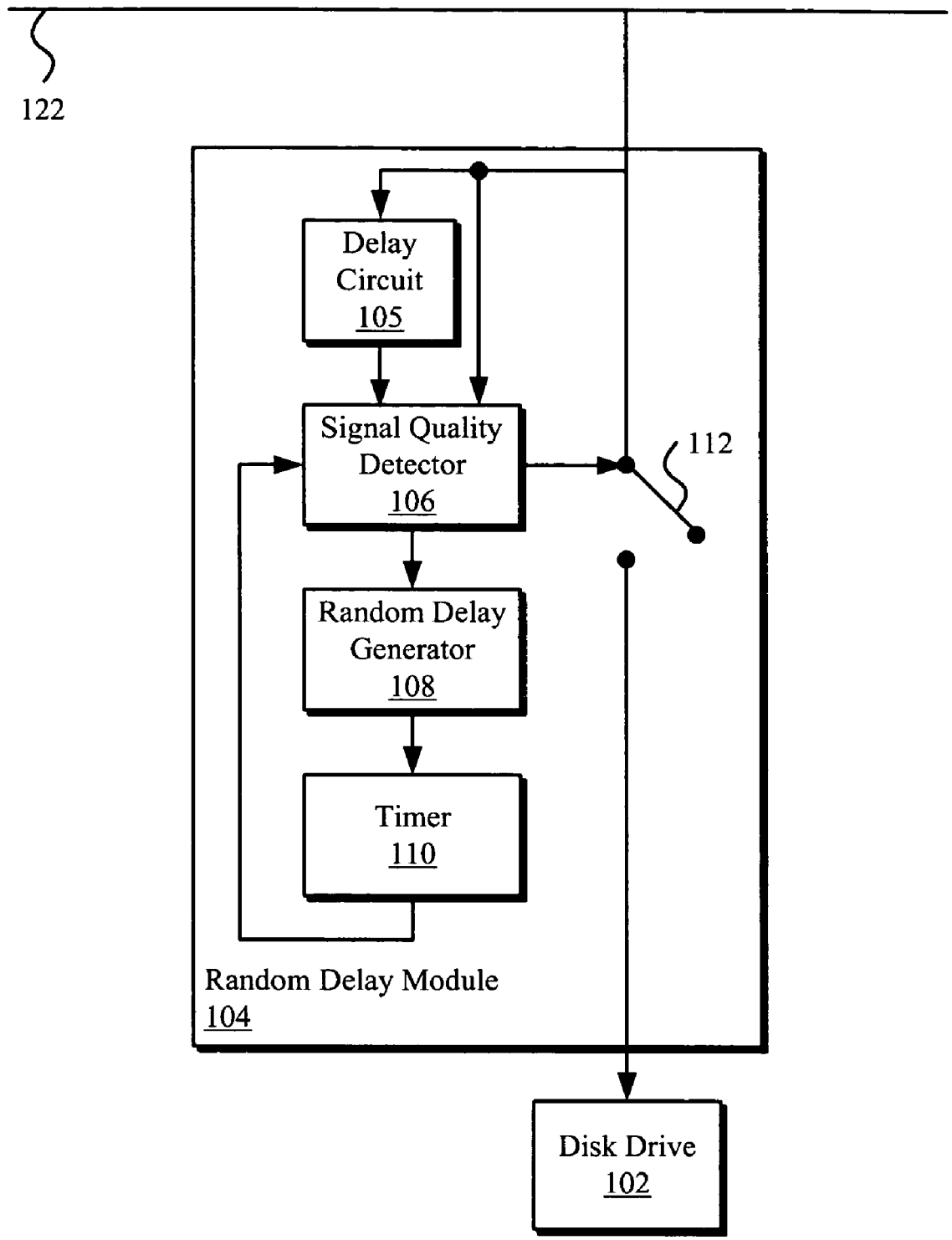
FIG. 3 is a block diagram illustrating the random delay module of FIG. 1 in more detail.

FIG. 3 is a block diagram illustrating in more detail one exemplary configuration of the random delay module 104. In particular, the random delay module 104 may generally include a signal quality detector 106, a random delay generator 108, a timer 110, and a switch 112. The switch 112 may by default be on or closed and is turned off or opened by the signal quality detector 106. In particular, when the signal quality detector 106 opens the switch 112, the corresponding disk drive 102 is disconnected from the power supply line 122 and is thus removed from being one of the power consumers on the power supply line 122. The signal quality detector 106 detects the quality of the signal on the power supply line 122. As an example, the signal quality detector 106 may compare the signal quality to a predetermined threshold, e.g., 12V±0.2V on a 12V power supply line 122. The signal quality threshold is typically determined based on the minimum amount of power required by the disk drive during the initial spin up or startup. As another example, the signal quality detector 106 may detect the stability or instability of the power signal over a predetermined period of time. In one example, the signal quality detector 106 may employ logical gates to detect the quality of the signal on the corresponding point along the power supply line 122 to generate a logical output, e.g., 0 or 1, as to whether the signal quality is sufficient or insufficient. If the signal quality is sufficient, i.e., at or above a signal quality threshold, the switch 112 remains closed or is closed to provide power to the corresponding disk drive 102. Alternatively, if the signal quality is insufficient, the switch 112 is opened or switched off and the timer 110 may cause the switch 112 to remain open for a back off or delay period as determined by the random delay generator 108. When the timer counts down the back off or delay period to 0, the process begins again in which the switch 112 is switched to the default on position and the signal quality detector 106 again detects the signal quality on the power supply line 122 to determine whether to once again open or switch the switch 112 to the off position.

As noted, rather than comparing the quality of the power signal against a signal quality threshold, the signal quality detector 106 may instead determine if the quality of the power signal is stable or unstable during a predetermined period of time, e.g., 0.5 seconds. As shown in FIG. 3, the random delay module 104 may include a delay circuit 105 such that the signal quality detector 106 may compare a current, non-delay power signal with a delayed power signal output by the delay circuit 105.

The process of detecting insufficient signal quality and generating a random delay is repeated for a number of iterations until the signal quality detector 106 detects sufficient signal quality at a corresponding point along the power supply line 122 and the switch 112 closes to provide power from the power supply line 122 to the corresponding disk drive 102. The random delay generator 108 may generate a random time period between 0 and T, the maximum amount of back off or delay for the first iteration, i.e., the back off time period from which a random number is selected or generated for the first iteration. As one example, the period of time T for the first iteration may be selected depending on the configuration of the various disk drives and/or the overall computer system, including the power supply. For example, the maximum amount of delay T for the first iteration may be related to the amount of time for each disk drive to reach its operational spin speed, e.g., 5 to 10 seconds.

After the random delay period for the particular iteration has expired, the switch 112 closes and the signal quality detector 106 again detects the quality of the power signal at the corresponding point along the power line 122. If the signal quality detector 106 again detects insufficient power signal quality, the switch 112 is opened and the random delay generator 108 generates a random number, e.g., between 0 and 2T on the second iteration, 0 and 4T on the third iteration, etc., doubling the maximum amount of delay for each iteration. In other words, the maximum random delay can be increased exponentially for each successive iteration such that the maximum random delay is equal to $2^{n-1}T$ where n is the iteration number and T is a predetermined maximum delay for the first iteration. It is to be understood that various methods for determining the time period from which a random number is generated for each iteration may be employed. Generally, increasing the time period from which a random number is generated for each successive iteration facilitates in minimizing successive conflicts for the resource, e.g., power, being managed and thus may result in better resource management. In the above-described example, the time period from which a random number is generated for each iteration doubles for each iteration. However, the time period for generation of the random delay for each iteration may be determined using any of numerous suitable methodologies, e.g., nT, $2.5^{n-1}T$, $3^{n-1}T$, $4^{n-1}T$, $5^{n-1}T$, fixed time period for each iteration, etc. In one embodiment, the back off time period from which a random number may be generated for each iteration is capped to a maximum value, e.g., 60 seconds or other time period depending on the application and the resource being managed, such that the back off time period does not become excessively large in a relatively short period of time. However, it is noted that where the back off time period is not capped, the circuitry may be simpler and thus less expensive.

Any of various random number generators may be employed. In addition, other mechanisms for determining the maximum amount of delay for each iteration may be similarly employed. For example, the same maximum amount of delay T may be employed for each iteration. As another example, the maximum amount of delay for each iteration may be nT where n is the number of iterations. Note that once closed, the switch 112 remains closed until the next time the computer system is powered up after powering down. Furthermore, each switch 112 may be configured to be closed, i.e., on or in the on position, by default.

Although the signal quality detector 106, random delay generator 108, and timer 110 are shown and described as separate and distinct components herein, any or all these elements may be combined into an integrated element. For example, the functions of the random delay generator 108 and the timer 110 may be integrated into a single random delay component. As another example, the functions of the signal quality detector 106 and the switch 112 may be integrated into a single signal quality switch component.

The random delay modules 104 are particularly suited for utilization in computer systems with multiple disk drives 102 due to the initial spike in the amount of power drawn by each disk drive 102. However, although the random delay modules 104 are shown and described herein as being associated with hard disk drives 102, it is to be understood that the random delay modules 104 may similarly be employed with various other system components for power management purposes. Furthermore, the random delay module 104 may be similarly employed for various other resource management purposes such as for applying random delays in systems using a fluid (liquid and/or gas) as a resource, etc.

Figure 4:
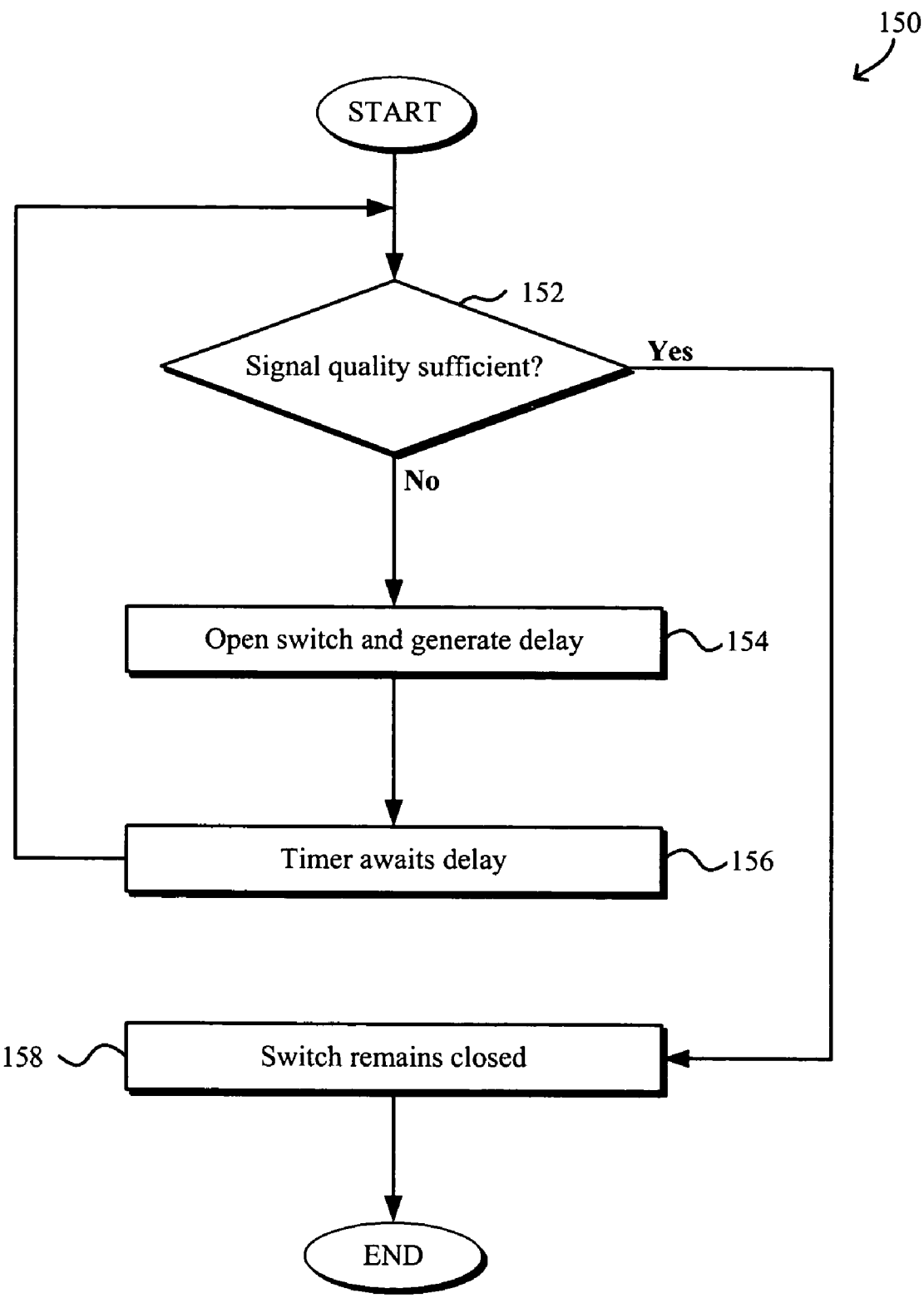
FIG. 4 is a flowchart illustrating a process for delay of a computer system with multiple disk drives.

FIG. 4 is a flowchart illustrating a process 150 for delayed startup of the multiple disk drives in a computer system. At decision block 152, the quality of the signal on the power line is determined. If the quality of the signal is sufficient, e.g., if the signal quality is at least a signal quality threshold or if the signal quality is stable over a predetermined period of time, then the switch is in the closed position at block 158. Alternatively, if the quality of the signal is insufficient, the switch is opened and a delay is generated at block 154. The delay may be fixed or in accordance with the number of iterations such as a random number within a range in accordance with the number of iterations. For example, the range may be between 0 and T for the first iteration, 0 and 2T for the second iteration, 0 and 4T for the third iteration, 0 and 8T for the fourth iteration, etc. After a timer awaits the delay at block 156, the process 150 returns to decision block 152 to again determine whether the signal quality on the power line is sufficient. If the signal quality is again insufficient, a delay is generated at block 154 in a range corresponding to the second iteration. Blocks 152, 154, 156 are repeated for a number of iterations until the signal quality is determined to be sufficient at block 152. Once the process 150 determines that the signal quality is sufficient at block 152, the switch remains closed at block 158 and the process 150 is complete.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A delay module, comprising:
   a signal quality detector configured to detect a signal quality between a power supply line and a system component;
   a delay generator configured to generate a delay in response to the signal quality detector detecting an insufficient signal quality, wherein the signal quality detector detects insufficient signal quality if the signal quality on the power supply line is unstable over a period of time, the signal quality detector being further configured to again detect the signal quality between the power supply line and the system component upon expiration of the delay; and
   a switch configured to selectively close upon the signal quality detector detecting sufficient signal quality.

2. The delay module of claim 1, wherein the delay generator performs an iteration of the delay generation each time the signal quality detector detects insufficient signal quality.

3. The delay module of claim 2, wherein the delay is randomly selected between 0 and $2^{n-1}T$ where n is an iteration number and T is a period from which a delay is selected on a first iteration of generating the delay.

4. The delay module of claim 1, wherein the switch disconnects the power supply line from the system component upon the signal quality detector detecting insufficient signal quality.

5. The delay module of claim 1, wherein the signal quality detector detects insufficient signal quality if the signal quality on the power supply line is also less than a threshold signal quality.

6. The delay module of claim 1, further comprising a timer configured to await the delay and to cause the signal quality detector to again detect the signal quality upon expiration of the delay.

7. The delay module of claim 1, wherein the system component is a disk drive.

8. A system, comprising:
   a power supply line;
   at least one delay module, each delay module including:
      a signal quality detector configured to detect a signal quality between the power supply line and a system component;
      a delay generator configured to generate a delay in response to the signal quality detector detecting an insufficient signal quality, wherein the signal quality detector detects insufficient signal quality if the signal quality on the power supply line is unstable over a period of time, the signal quality detector being further configured to again detect the signal quality between the power supply line and the system component upon expiration of the delay; and
      a switch configured to close upon the signal quality detector detecting sufficient signal quality; and
   at least one system component each coupled to the power supply line via a corresponding one of the at least one delay module.

9. The system of claim 8, wherein each delay generator performs an iteration of the delay generation each time the corresponding signal quality detector detects insufficient signal quality between the power supply line and the corresponding system component.

10. The system of claim 9, wherein the delay is randomly selected between 0 and $2^{n-1}T$ where n is an iteration number and T is a period from which a delay is selected on a first iteration of generating the delay.

11. The system of claim 8, wherein the switch of the delay module disconnects the power supply line from the corresponding system component upon the corresponding signal quality detector detecting insufficient signal quality between the power supply line and the corresponding system component.

12. The system of claim 8, wherein the signal quality detector detects insufficient signal quality if the signal quality on the power supply line is also less than a threshold signal quality.

13. A system, comprising:
   a power supply line;
   at least one delay module, each delay module including:
      a signal quality detector configured to detect a signal quality between the power supply line and a system component;
      a delay generator configured to generate a delay in response to the signal quality detector detecting an insufficient signal quality, wherein the signal quality detector detects the insufficient signal quality if the signal quality on the power supply line is unstable during a predetermined period of time by comparing a current signal quality and a delay signal quality, the signal quality detector being further configured to again detect the signal quality between the power supply line and the system component upon expiration of the delay; and a switch configured to close upon the signal quality detector detecting sufficient signal quality; and at least one system component each coupled to the power supply line via a corresponding one of the at least one delay module.

14. The system of claim 8, wherein each delay module further includes a timer configured to await the delay and to cause the signal quality detector to again detect the signal quality upon expiration of the delay.

15. The system of claim 8, wherein each of the system components is a disk drive.

16. A power management apparatus, comprising:

means for detecting signal quality on a power supply line;

means for generating a delay in response to the signal quality detecting means detecting insufficient signal quality, wherein the signal quality detecting means detects insufficient signal quality if the signal quality on the power supply line is unstable over a period of time, the signal quality detecting means for again detecting the signal quality on the power supply line upon expiration of the delay generated by the delay generating means; and switching means for one of disconnecting to the power supply line upon the signal quality detecting mean detecting insufficient signal quality and connecting to the power supply line upon the signal quality detecting means detecting sufficient signal quality.

17. The power management apparatus of claim 16, wherein the delay generating means performs an iteration of the delay generation each time the signal quality detecting means detects insufficient signal quality.

18. The power management apparatus of claim 17, wherein the delay generating means is for generating a random delay between 0 and $2^{n-1}T$ where n is an iteration number and T is a period from which a random delay is generated on a first iteration of generating the random delay.

19. The power management apparatus of claim 16, wherein the switching means disconnects to the power supply line upon the signal quality detecting means detecting insufficient signal quality on the power supply line.

20. The power management apparatus of claim 16, wherein the signal quality detecting means detects insufficient signal quality if the signal quality on the power supply line is also less than a threshold signal quality.

21. A power management apparatus, comprising:

signal quality detecting means for detecting signal quality on a power supply line;

delay generating means for generating a delay in response to the signal quality detecting means detecting insufficient signal quality, wherein signal quality detecting means detects the insufficient signal quality if the signal quality on the power supply line is unstable during a predetermined period of time by comparing a current signal quality and a delay signal quality, the signal quality detecting means for again detecting the signal quality on the power supply line upon expiration of the delay generated by the delay generating means;

switching means for one of disconnecting to the power supply line upon the signal quality detecting mean detecting insufficient signal quality and connecting to the power supply line upon the signal quality detecting means detecting sufficient signal quality.

22. The power management apparatus of claim 16, further comprising a timing means to await the delay and to cause the signal quality detecting means to again detect the signal quality upon expiration of the delay.

23. A method for power management, comprising:

detecting a power signal quality between a power supply line and a power-utilizing component;

generating a delay in response to detecting an insufficient signal quality, wherein the detecting detects insufficient signal quality if the signal quality is unstable over a period of time, the detecting being repeated upon expiration of the delay; and switching to one of disconnect the power supply line to the power-utilizing component upon the detecting of insufficient signal quality and connect the power supply line to the power-utilizing component upon the detecting of sufficient signal quality.

24. The method of claim 23, wherein an iteration of the generating the delay is performed each time the detecting detects insufficient signal quality.

25. The method of claim 24, wherein the delay is randomly selected between 0 and $2^{n-1}T$ where n is an iteration number and T is a period from which a random delay is generated on a first iteration of generating the random delay.

26. The method of claim 23, wherein the switching includes disconnecting the power supply line from the power-utilizing component upon the detecting of insufficient signal quality.

27. The method of claim 23, wherein the detecting detects insufficient signal quality if the signal quality on the power supply line is also less than a threshold signal quality.

28. A method for power management, comprising:

detecting a power signal quality between a power supply line and a power-utilizing component;

generating a delay in response to detecting an insufficient signal quality, wherein the detecting detects unstable signal quality during a predetermined period of time by comparing a current power signal and a delay power signal, the detecting being repeated upon expiration of the delay; and switching to one of disconnect the power supply line to the power-utilizing component upon the detecting of insufficient signal quality and connect the power supply line to the power-utilizing component upon the detecting of sufficient signal quality.

29. The method of claim 23, further comprising awaiting the delay and upon expiration of the delay, repeating the detecting of the signal quality between the power supply line and the power-utilizing component.

30. The method of claim 23, wherein the power-utilizing component is a disk drive.

31. A resource management system, comprising:

a delay module, including:

a resource detector configured to detect a resource supply quality between a resource supply and a resource receiving component;

a delay generator configured to generate a delay in response to the resource detector detecting an insufficient resource supply quality, wherein the resource detector detects insufficient signal quality if the resource supply quality is unstable over a period of time, the resource detector being further configured to again detect the resource supply quality between the resource supply and the resource receiving component upon expiration of the delay; and a switch configured to selectively close upon the resource detector detecting sufficient resource supply.

32. The resource management system of claim 31, further comprising a plurality of the resource receiving components and a plurality of the delay modules, each resource receiving component corresponding to one of the delay modules.

33. The resource management system of claim 31, wherein the delay generator is a random delay generator configured to generate a random delay.

34. A method for resource management, comprising:
  detecting a resource supply quality between a resource supply line and a resource-utilizing component;
  disconnecting the resource-utilizing component from the resource supply line upon detecting an insufficient resource supply quality, wherein the resource supply quality is insufficient if the resource supply quality is unstable over a period of time;
  generating a delay upon detecting the insufficient resource supply quality, the detecting being repeated upon expiration of the delay; and
  connecting the resource-utilizing component to the resource supply line upon the detecting of sufficient resource supply quantity.

* * * * *

UNITED STATES PATENT AND TRADEMARK OFFICE
CERTIFICATE OF CORRECTION

| | | |
|---|---|---|
| PATENT NO. | : 7,475,267 B1 | Page 1 of 1 |
| APPLICATION NO. | : 10/816155 | |
| DATED | : January 6, 2009 | |
| INVENTOR(S) | : Cocosel | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this
Third Day of May, 2011

David J. Kappos
*Director of the United States Patent and Trademark Office*